(12) United States Patent
Xi et al.

(10) Patent No.: US 11,791,553 B2
(45) Date of Patent: Oct. 17, 2023

(54) PHASE SHIFTER, FABRICATION METHOD THEREOF, AND ANTENNA

(71) Applicants: Shanghai Tianma Micro-Electronics Co., Ltd., Shanghai (CN); Chengdu Tianma Micro-Electronics Co., Ltd., Chengdu (CN)

(72) Inventors: Kerui Xi, Shanghai (CN); Xuhui Peng, Shanghai (CN); Feng Qin, Shanghai (CN); Tingting Cui, Shanghai (CN); Qinyi Duan, Chengdu (CN); Qiongqin Mao, Shanghai (CN)

(73) Assignees: Shanghai Tianma Micro-Electronics Co., Ltd., Shanghai (CN); Chengdu Tianma Micro-Electronics Co., Ltd., Chengdu (CN)

( * ) Notice: Subject to any disclaimer, the term of this patent is extended or adjusted under 35 U.S.C. 154(b) by 255 days.

(21) Appl. No.: 17/425,572

(22) PCT Filed: Aug. 24, 2020

(86) PCT No.: PCT/CN2020/110756
§ 371 (c)(1),
(2) Date: Jul. 23, 2021

(87) PCT Pub. No.: WO2022/016646
PCT Pub. Date: Jan. 27, 2022

(65) Prior Publication Data
US 2022/0320731 A1    Oct. 6, 2022

(30) Foreign Application Priority Data

Jul. 24, 2020 (CN) .......................... 202010721226.6

(51) Int. Cl.
*H01Q 21/06* (2006.01)
*H01Q 3/36* (2006.01)

(52) U.S. Cl.
CPC ..................................... *H01Q 3/36* (2013.01)

(58) Field of Classification Search
CPC .......... H01Q 3/36; H01Q 3/30; H01Q 21/065; H01P 1/181; H01P 1/18; G02F 1/13
See application file for complete search history.

(56) References Cited

U.S. PATENT DOCUMENTS

2019/0004345 A1*  1/2019  Jiang ...................... G02B 27/00
2019/0103671 A1*  4/2019  Dong ...................... H01Q 1/364
(Continued)

FOREIGN PATENT DOCUMENTS

CN    104236857 A    12/2014
CN    106054442 A    10/2016
(Continued)

OTHER PUBLICATIONS

International Search Report and Written Opinion dated Apr. 29, 2021, in corresponding International Patent Application No. PCT/CN2020/110756, filed Aug. 24, 2020, 9 pages.

*Primary Examiner* — Awat M Salih
(74) *Attorney, Agent, or Firm* — CHRISTENSEN O'CONNOR JOHNSON KINDNESS PLLC

(57) ABSTRACT

A phase shifter, a fabrication method thereof, and an antenna are provided. The phase shifter includes a first substrate, a second substrate, a ground electrode disposed on a side of the first substrate facing towards the second substrate, a transmission electrode disposed on a side of the second substrate facing towards the first substrate, and liquid crystals filled between the first substrate and the second substrate. In a direction perpendicular to a plane of the second substrate, the transmission electrode overlaps with the ground electrode. The ground electrode is provided with a detection hollow part, and in the direction perpendicular to the plane of the second substrate, at least a part of the
(Continued)

detection hollow part does not overlap with the transmission electrode.

20 Claims, 10 Drawing Sheets

(56) References Cited

U.S. PATENT DOCUMENTS

| | | | | |
|---|---|---|---|---|
| 2019/0294007 | A1* | 9/2019 | Wang | G02F 1/1343 |
| 2020/0257149 | A1* | 8/2020 | Li | G02F 1/1343 |
| 2021/0328355 | A1* | 10/2021 | Xi | H01Q 5/357 |
| 2021/0408680 | A1* | 12/2021 | Xi | H01P 1/184 |

FOREIGN PATENT DOCUMENTS

| | | |
|---|---|---|
| CN | 106773338 A | 5/2017 |
| CN | 108710232 A | 10/2018 |
| CN | 109164608 A | 1/2019 |
| CN | 110824735 A | 2/2020 |
| WO | 2011/106831 A1 | 9/2011 |

* cited by examiner

PHASE SHIFTER, FABRICATION METHOD THEREOF, AND ANTENNA

This application is a national stage of International Application No. PCT/CN2020/110756, filed on Aug. 24, 2020, which claims priority to Chinese Patent Application No. 202010721226.6, filed with the China National Intellectual Property Administration (CNIPA) on Jul. 24, 2020, and entitled "PHASE SHIFTER, FABRICATION METHOD THEREOF, AND ANTENNA", which are incorporated herein by reference in their entirety.

TECHNICAL FIELD

The present disclosure relates to the technical field of liquid crystal antennas, and in particular, to a phase shifter, a fabrication method thereof, and an antenna.

BACKGROUND

With the development of communications systems, phase shifters have been increasingly widely used. Taking a liquid crystal phase shifter as an example, the liquid crystal phase shifter controls its liquid crystals to rotate to change a dielectric constant of the liquid crystals, thereby achieving the phase shift of a radio-frequency signal transmitted in the liquid crystal phase shifter.

In the related art, a large area of a ground electrode in a liquid crystal phase shifter is covered. Therefore, in a fabrication process of the liquid crystal phase shifter, after two substrates are oppositely arranged to form a liquid crystal cell, no light can pass through the liquid crystal cell. As a result, the cell gap test and the optical judgment cannot be performed on the liquid crystal phase shifter, and a degraded liquid crystal phase shifter or an ineffective liquid crystal phase shifter may be applied in an antenna, which will not only lead to a waste of costs in a subsequent module fabrication process, but also seriously affect the radiation performance of the antenna.

SUMMARY

In one aspect, an embodiment of the present disclosure provides a phase shifter The phase shifter includes: a first substrate and a second substrate that are disposed opposite to each other; a ground electrode disposed on a side of the first substrate facing towards the second substrate; a transmission electrode disposed on a side of the second substrate facing towards the first substrate, where the transmission electrode overlaps the ground electrode in a direction perpendicular to a plane of the second substrate; and liquid crystals filled between the first substrate and the second substrate. The ground electrode is provided with at least one detection hollow part, and at least a part of the at least one detection hollow part does not overlap the transmission electrode in the direction perpendicular to the plane of the second substrate.

In another aspect, an embodiment of the present disclosure provides a fabrication method of a phase shifter. The fabrication method of the phase shifter includes: providing a first substrate, and forming, on the first substrate, a ground electrode provided with at least one detection hollow part; providing a second substrate, and forming a transmission electrode on the second substrate; and oppositely arranging the first substrate and the second substrate to form a cell, and filling liquid crystals in the cell, wherein in a direction perpendicular to a plane of the second substrate, the ground electrode overlaps the transmission electrode, and the at least one detection hollow part does not overlap the transmission electrode.

In still another aspect, an embodiment of the present disclosure provides an antenna, and the antenna includes the forgoing phase shifter, a feeder disposed on a side of the first substrate facing away from the second substrate and configured to receive a radio-frequency signal, and a radiator disposed on the side of the first substrate facing away from the second substrate and configured to radiate a phase-shifted radio-frequency signal.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art can still derive other drawings from these accompanying drawings without creative efforts.

DETAILED DESCRIPTION

For a better understanding of the technical solutions in this application, the embodiments of this application are described in detail below with reference to the accompanying drawings.

It should be pointed out that the described embodiments are merely a part rather than all of the embodiments of this application. All other embodiments obtained by persons of ordinary skill in the art based on the embodiments of this application without creative efforts shall fall within the protection scope of this application.

Terms in the embodiments of this application are merely used to describe specific embodiments, and are not intended to limit this application. Unless otherwise specified in the context, words, such as "a", "the", and "this", in a singular form in the embodiments and appended claims of this application include plural forms.

It should be understood that the term "and/or" used in this specification describes only an association relationship for describing associated objects and represents that three relationships may exist. For example, A and/or B may represent the following three cases: A alone, A and B, and B alone. In addition, the character "/" in this specification generally indicates that the associated objects are in an "or" relationship.

It should be understood that although terms "first" and "second" can be used in the embodiments of the present disclosure to describe substrates, electrodes, and tooth electrode strips, these substrates, electrodes, and tooth electrode strips should not be limited to these terms. These terms are used only to distinguish the substrates, electrodes, and tooth electrode strips from each other. For example, without departing from the scope of the embodiments of the present disclosure, a first substrate can also be referred to as a second substrate; and similarly, a second substrate can also be referred to as a first substrate.

Figure 1:
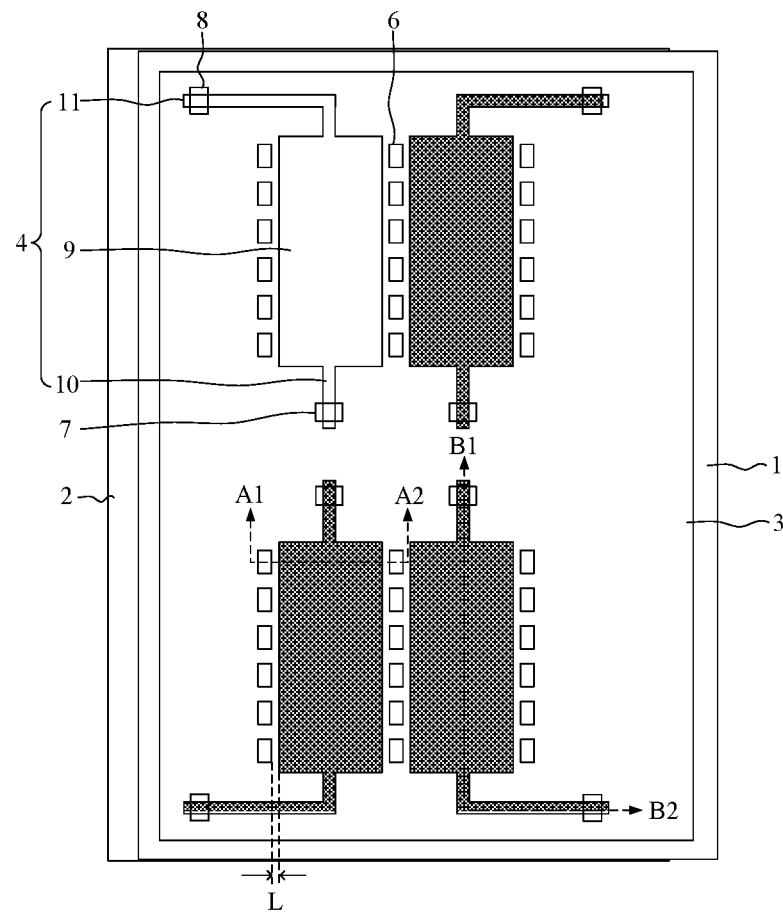
FIG. 1 is a schematic diagram of a phase shifter according to an embodiment of the present disclosure.
Figure 2:
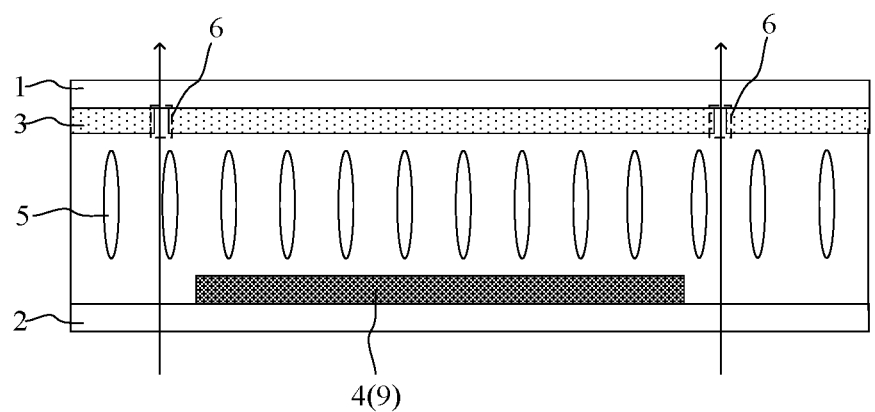
FIG. 2 is a cross-sectional view of FIG. 1 along A1-A2.

An embodiment of the present disclosure provides a phase shifter. As shown in FIG. 1 and FIG. 2, FIG. 1 is a schematic diagram of a phase shifter according to an embodiment of the present disclosure, and FIG. 2 is a cross-sectional view of FIG. 1 along A1-A2. The phase shifter includes a first substrate 1 and a second substrate 2 that are disposed opposite to each other, a ground electrode 3 disposed on a side of the first substrate 1 facing towards the second substrate 2, a transmission electrode 4 disposed on a side of the second substrate 2 facing towards the first substrate 1, and liquid crystals 5 filled between the first substrate 1 and the second substrate 2. In a direction perpendicular to a plane of the second substrate 2, the transmission electrode 4 overlaps the ground electrode 3. The ground electrode 3 is provided with a detection hollow part 6, and in the direction perpendicular to the plane of the second substrate 2, at least a part of the detection hollow part 6 does not overlap the transmission electrode 4.

In a fabrication process of the phase shifter, after the first substrate 1 and the second substrate 2 are oppositely arranged to form a liquid crystal cell, detection light can be provided to the phase shifter, and a cell gap test and an optical judgment are performed on the phase shifter utilizing the detection light emitted through the detection hollow part 6, for example, determining alignment and filling statuses of the liquid crystals 5 in the phase shifter.

Specifically, when the cell gap test is performed on the phase shifter, the detection light is provided to the phase shifter in a direction from the second substrate 2 to the first substrate 1, and light emitted through a plurality of detection hollow parts 6 is detected by a cell gap measurement device to determine a cell gap. During determining of the alignment status of the liquid crystals 5 of the phase shifter, an upper polarizer is disposed on a side of the first substrate 1 facing away from the second substrate 2, a lower polarizer is disposed on a side of the second substrate 2 facing away from the first substrate 1, the detection light is provided to the phase shifter along the direction from the second substrate 2 to the first substrate 1, and the alignment status of the liquid crystals 5 at different positions is determined by determining the brightness of light emitted through different detection hollow parts 6. If it is detected that the brightness of the light emitted through the different detection hollow parts 6 is the same, it is indicated that the liquid crystals 5 of the phase shifter are completely aligned. If it is detected that the brightness of the light emitted through the different detection hollow parts 6 is different, it is indicated that the liquid crystals 5 of the phase shifter are not completely aligned. During determining of the filling status of the liquid crystals 5 of the phase shifter, the detection light is provided to the phase shifter along the direction from the second substrate 2 to the first substrate 1, and the filling status of the liquid crystals 5 in the liquid crystal cell is determined through the detection hollow parts 6 by using human eyes or a detection device.

It should be noted that, to implement normal detection of the phase shifter, the first substrate 1 and the second substrate 2 each can be a transparent substrate such as a glass substrate, or the first substrate 1 and the second substrate 2 each can be an opaque substrate, such as a high-frequency substrate, and in this case, openings can be arranged at positions of the first substrate 1 and the second substrate 2 that correspond to the detection hollow parts 6, which ensures that the detection light can enter through the openings of the first substrate 1 and be emitted through the openings of the second substrate 2.

It can be learnt that, according to the phase shifter provided in this embodiment of the present disclosure, the ground electrode 3 is provided with the detection hollow part 6, and at least a part of the detection hollow part 6 does not overlap the transmission electrode 4, which can form a light transmittance area in the liquid crystal cell of the phase shifter. Therefore, before the phase shifter is put into use, the cell gap test and the optical judgment can be performed on the phase shifter to detect whether the phase shifter is degraded or ineffective, thereby avoiding applying a degraded phase shifter or an ineffective phase shifter in an antenna. In this way, it is not only avoided that a subsequent antenna module fabrication process wastes cost, but also avoided that a radiation angle of a beam radiated by the antenna is affected, which optimizes the radiation performance of the antenna.

In an embodiment, because the light transmittance area through which the detection light is transmitted has been formed in an area in which the detection hollow part 6 is located, the ground electrode 3 and the transmission electrode 4 can be made of opaque metal materials, for example, materials with good conductivity such as copper, gold, silver, and aluminum, which enlarge a selection range of materials of the ground electrode 3 and the transmission electrode 4.

Figure 3:
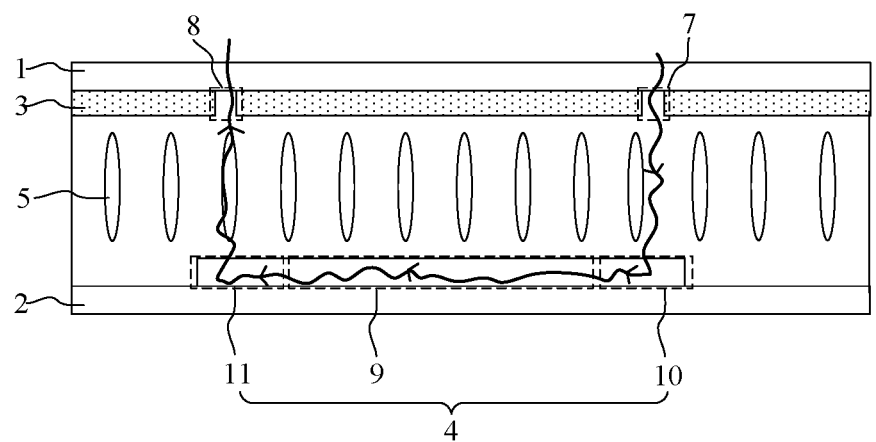
FIG. 3 is a cross-sectional view of FIG. 1 along B1-B2.

In an embodiment, with reference to FIG. 1 and FIG. 2, as shown in FIG. 3, FIG. 3 is a cross-sectional view of FIG. 1 along B1-B2. The ground electrode 3 is further provided with a first coupling hollow part 7 and a second coupling hollow part 8 that are configured to couple radio-frequency signals. The transmission electrode 4 includes a main electrode 9, a first electrode 10, and a second electrode 11, the main electrode 9 is connected to both the first electrode 10 and the second electrode 11, and the first electrode 10 and the second electrode 11 are located at two opposite sides of the main electrode 9. In a direction perpendicular to a plane of the first substrate 1, the first electrode 10 overlaps the first coupling hollow part 7, and the second electrode 11 overlaps the second coupling hollow part 8.

Figure 20:
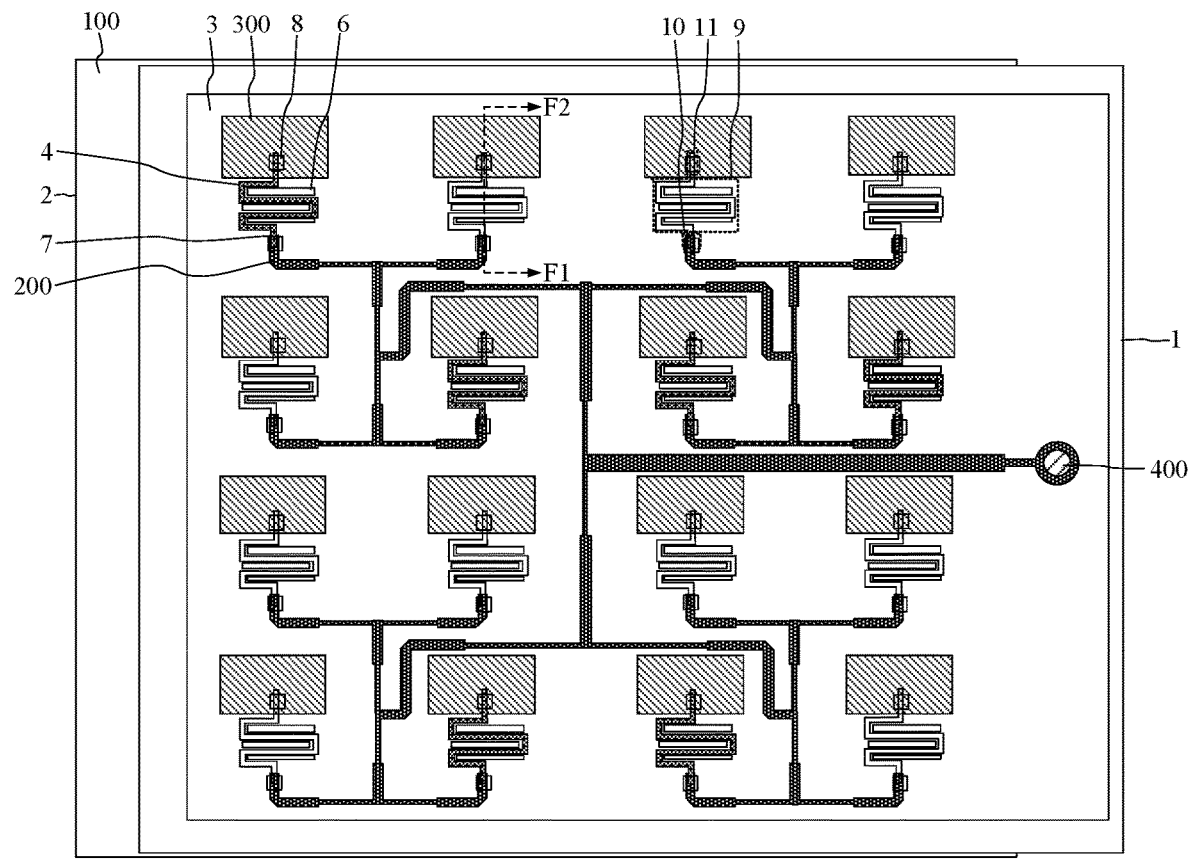
FIG. 20 is a schematic diagram of an antenna according to an embodiment of the present disclosure.
Figure 21:
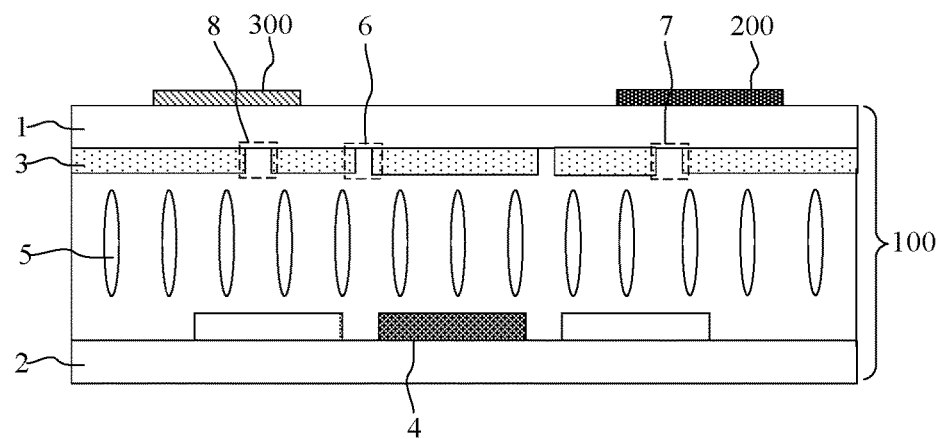
FIG. 21 is a cross-sectional view of FIG. 20 along F1-F2 according to an embodiment of the present disclosure.

Specifically, with reference to FIG. 20 and FIG. 21, an antenna is provided with a feeder 200 and a radiator 300, and the feeder 200 is configured to receive a radio-frequency signal. When the phase shifter performs phase shift on the radio-frequency signal, the radio-frequency signal transmitted on the feeder 200 is coupled to the first electrode 10 of the transmission electrode 4 through the first coupling hollow part 7 of the ground electrode 3 and is transmitted to the main electrode 9; the liquid crystals 5 rotate under the an electric field formed by the ground electrode 3 and the transmission electrode 4, and a dielectric constant of the liquid crystals 5 changes, and the radio-frequency signal transmitted on the main electrode 9 is phase-shifted; and a phase-shifted radio-frequency signal is transmitted to the second electrode 11, is coupled to the radiator 300 through the second coupling hollow part 8 of the ground electrode 3, and then is radiated through the radiator 300. In this way, normal signal radiation of the antenna is ensured.

In an embodiment, still referring to FIG. 1, the main electrode 9 is of a planar structure; and in the direction perpendicular to the plane of the second substrate 2, the detection hollow part 6 does not overlap the main electrode 9, and a spacing between the detection hollow part 6 and an edge of the transmission electrode 4 is L, where $0 \leq L \leq 2$ mm.

With reference to the foregoing phase shift principle, it can be learnt that when the radio-frequency signal is transmitted on the main electrode 9, the phase shift is implemented under the action of the liquid crystals. Therefore, an area in which the main electrode 9 is located is a key area in which the phase shifter performs the phase shift on the radio-frequency signal. In other words, the cell gap of the liquid crystal cell corresponding to the area in which the main electrode 9 is located, and the alignment and filling statuses of the liquid crystals 5 play a decisive role in a phase shift effect of the radio-frequency signal. Therefore, the detection hollow part 6 is disposed in an area within 2 mm around the main electrode 9, so that the detection light emitted through the detection hollow part 6 can better reflect the cell gap in the area in which the main electrode 9 is located, the alignment status of the liquid crystals 5, and the filling status of the liquid crystals 5. In this way, the cell gap test and the optical judgment can be performed on the key area in the phase shifter more accurately. Moreover, it should be noted that because other areas outside the key area have far less impact on the phase shift effect of the radio-frequency signal than the key area, on the premise that the cell gap test and the optical judgment have been performed on the key area, there is no need to additionally detect cell gapes and liquid crystal statuses in other areas. In this case, there can be no need to provide hollow detection parts 6 in other areas of the ground electrode 3, which reduces the number of hollow detection parts 6 that disposed in the ground electrode 3, and reduces the impact on the shielding performance of the ground electrode 3. In addition, with this structure, there is no need to provide an opening inside the main electrode 9 for allowing the detection light to pass through, so as to ensure the reliability of radio-frequency signal transmission in the main electrode 9.

In addition, it should also be noted that because the feeder 200 overlaps the first electrode 10 and the radiator 300 overlaps the second electrode 11, the detection hollow part 6 are disposed around the main electrode 9, which can also avoid that the feeder 200 and the radiator 300 overlap the detection hollow part 6, thereby preventing the feeder 200 and the radiator 300 from blocking the detection hollow part 6.

Figure 4:
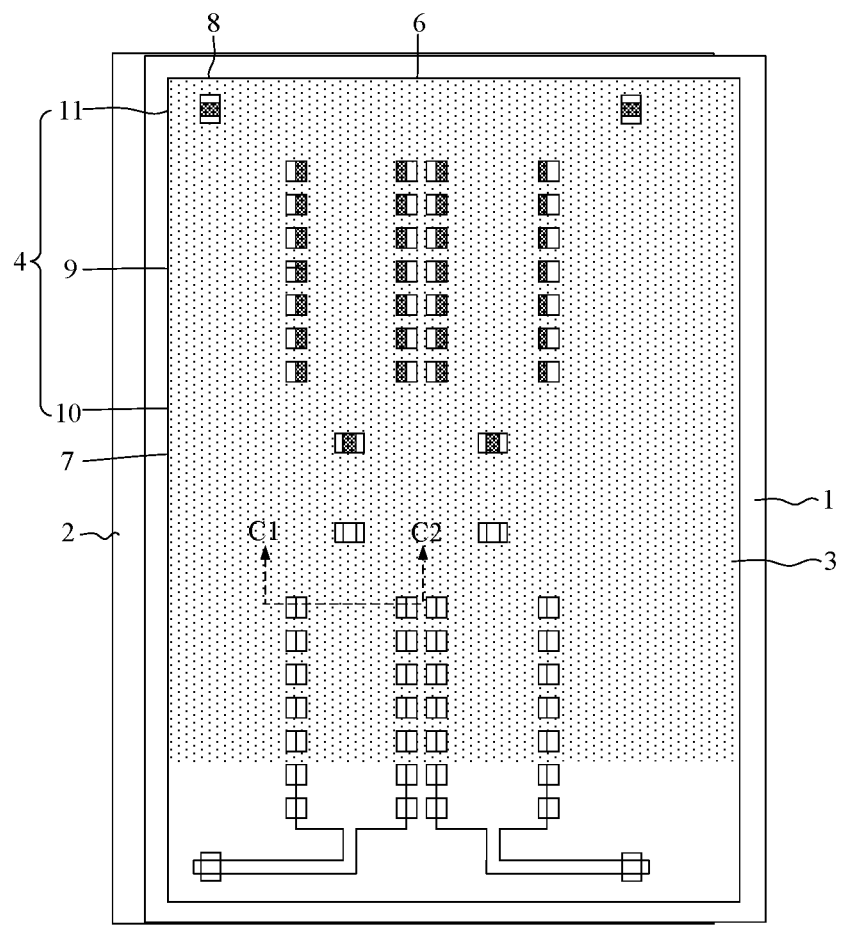
FIG. 4 is another schematic diagram of a phase shifter according to an embodiment of the present disclosure.
Figure 5:
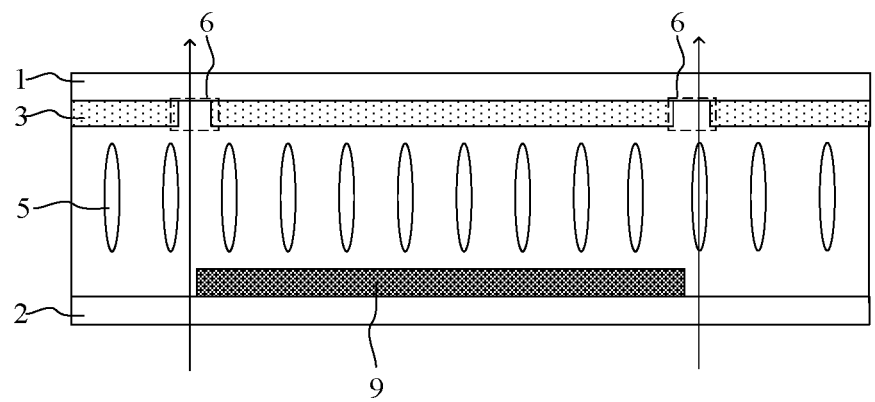
FIG. 5 is a cross-sectional view of FIG. 4 along C1-C2.

In an embodiment, as shown in FIG. 4 and FIG. 5, FIG. 4 is another schematic diagram of a phase shifter according to an embodiment of the present disclosure, and FIG. 5 is a cross-sectional view of FIG. 4 along C1-C2. A main electrode 9 is of a planar structure, and in the direction perpendicular to the plane of the second substrate 2, a part of a detection hollow part 6 overlaps the main electrode 9, and the other part of the detection hollow part 6 does not overlap the main electrode 9. In this case, detection light is emitted through a part of the detection hollow part 6 that does not overlap the main electrode 9, the emitted detection light can accurately reflect a cell gap at an edge of the main electrode 9 and a status of liquid crystals 5, which can better reflect a cell gap in an area in which the main electrode 9 is located, the alignment status of the liquid crystals 5, and a filling status of the liquid crystals 5, thereby achieving more accurate cell gap test and the optical judgment on a key area. Moreover, with such structure, there is no need to provide an opening inside the main electrode 9 for allowing the detection light to pass through, so as to ensure the reliability of radio-frequency signal transmission in the main electrode 9.

Figure 6:
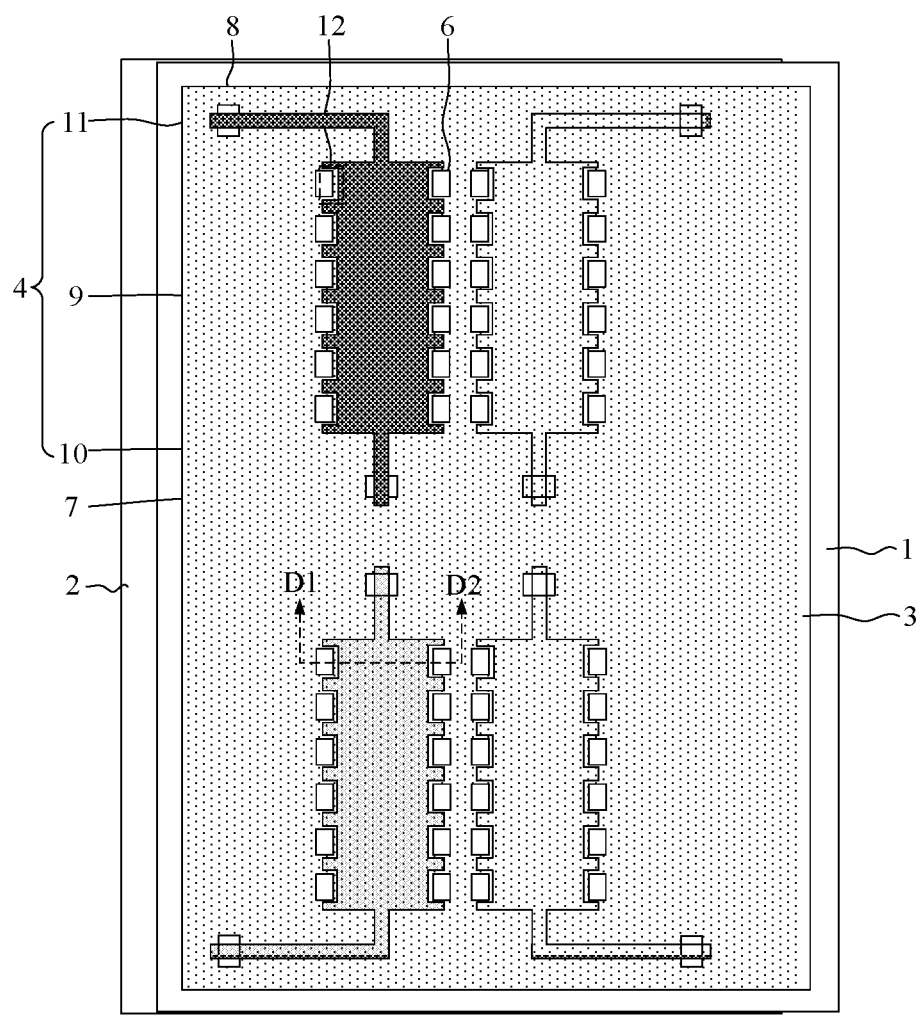
FIG. 6 is still another schematic diagram of a phase shifter according to an embodiment of the present disclosure.
Figure 7:
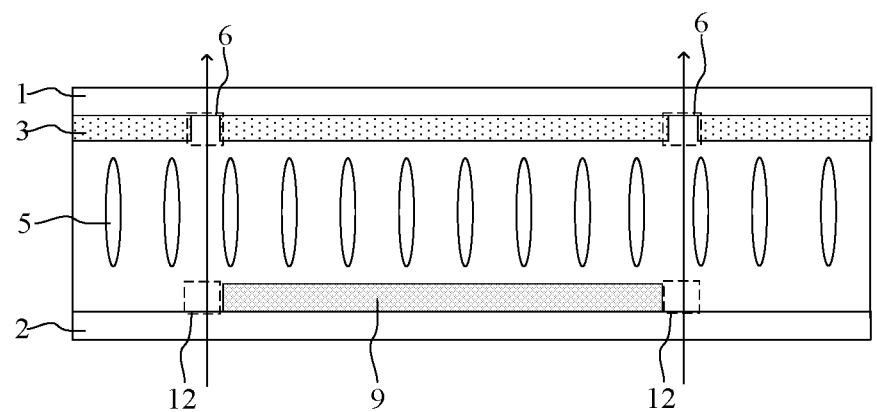
FIG. 7 is a cross-sectional view of FIG. 6 along D1-D2.

In an embodiment, as shown in FIG. 6 and FIG. 7, FIG. 6 is still another schematic diagram of a phase shifter according to an embodiment of the present disclosure, and FIG. 7 is a cross-sectional view of FIG. 6 along D1-D2. A main electrode 9 is of a planar structure; an opening 12 is provided on the main electrode 9; and in the direction perpendicular to the plane of the second substrate 2, a detection hollow part 6 overlaps the opening 12. With such configuration, the opening 12 is provided inside the main electrode 9, and the detection hollow part 6 overlaps the opening 12. In this way, detection light that passes through the opening 12 and that is emitted through the detection hollow part 6 can directly and accurately reflect a cell gap in an area in which the main electrode 9 is located and a status of liquid crystals 5, thereby achieving more accurate cell gap test and the optical judgment on the key area.

In an embodiment, still referring to FIG. 6, the opening 12 on the main electrode 9 covers a part of an edge of the main electrode 9. In other words, the opening 12 is located at the edge of the main electrode 9, which reduces a loss, caused by the opening 12, of the radio-frequency signal transmitted on the main electrode 9, and improves the reliability of radio-frequency signal transmission.

Figure 8:
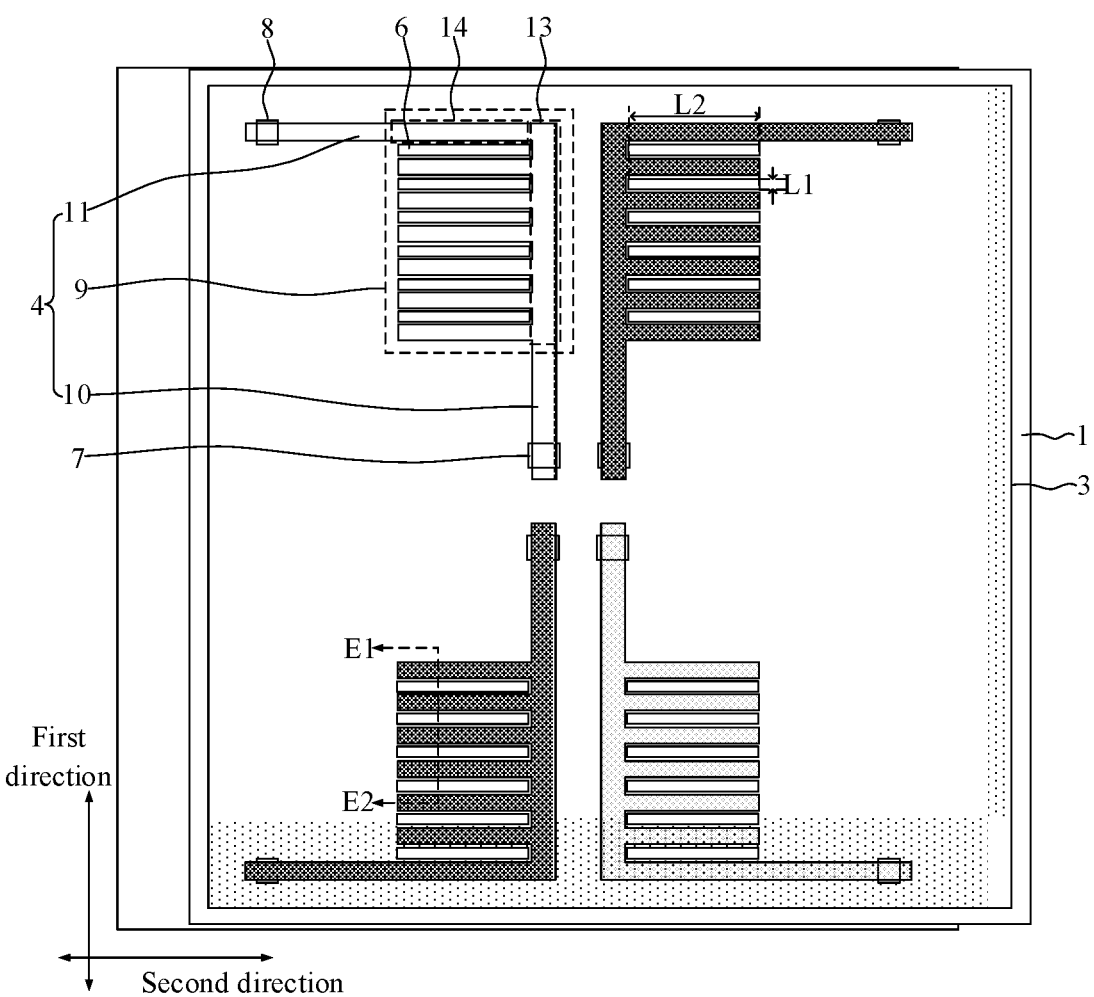
FIG. 8 is yet another schematic diagram of a phase shifter according to an embodiment of the present disclosure.
Figure 9:
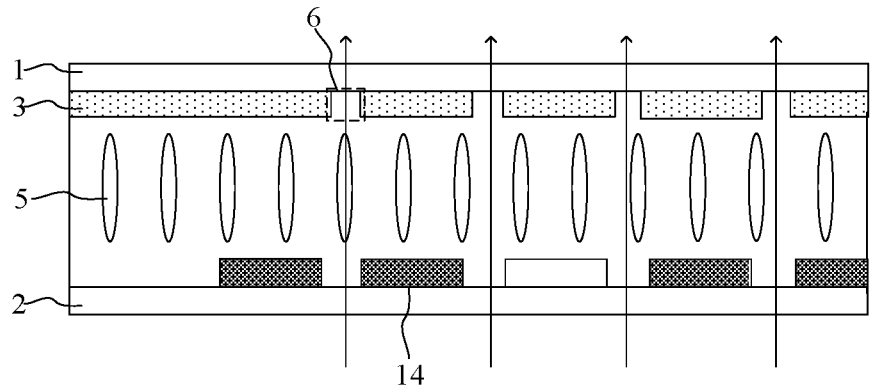
FIG. 9 is a cross-sectional view of FIG. 8 along E1-E2.

In an embodiment, as shown in FIG. 8 and FIG. 9, FIG. 8 is yet another schematic diagram of a phase shifter according to an embodiment of the present disclosure, and FIG. 9 is a cross-sectional view of FIG. 8 along E1-E2. A main electrode 9 is of a comb tooth-shaped structure, and the main electrode 9 includes a main electrode strip 13 and a plurality of tooth electrode strips 14, the main electrode strip 13 extends along a first direction, the tooth electrode strips 14 are arranged along the first direction, each tooth electrode strip 14 extends along a second direction, and the first direction and the second direction intersect. In the direction perpendicular to the plane of the second substrate 2, at least a part of the detection hollow part 6 overlaps a gap between two adjacent tooth electrode strips 14.

When the main electrode 9 adopts the comb-like structure, based on its structure characteristic of the main electrode 9, the detection hollow part 6 can be disposed only at a position of the ground electrode 3 corresponding to a gap between the tooth electrode strips 14, which can implement the effective detection of a cell gap in an entire area in which the main electrode 9 is located and a status of liquid crystals 5. In this way, the cell gap test and the optical judgment are more accurately conducted on a key area to determine whether phase shift can be accurately conducted on a radio-frequency signal in the key area. In addition, there is no need to provide an opening on the main electrode 9, thereby avoiding a loss, caused by the opening, of the radio-frequency signal transmitted on the main electrode strip 13. The main electrode 9 is of the comb-like structure, which can broaden a transmission path of the radio-frequency signal on the main electrode 9, and thus make the phase shift of the radio-frequency signal more sufficient.

Figure 10:
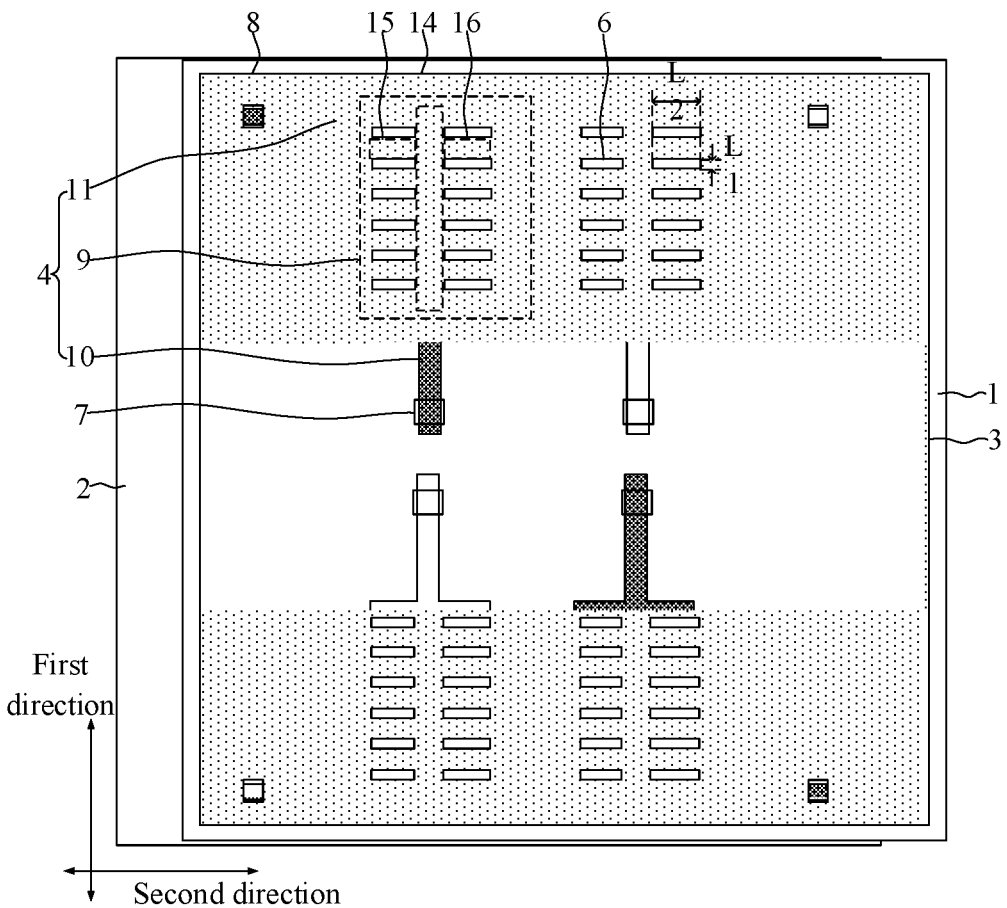
FIG. 10 is still yet another schematic diagram of a phase shifter according to an embodiment of the present disclosure.

In an embodiment, as shown in FIG. 10, FIG. 10 is still yet another schematic diagram of a phase shifter according to an embodiment of the present disclosure. A main electrode 9 is of a comb tooth-shaped structure, and the main electrode 9 includes a main electrode strip 13, first tooth electrode strips 15, and second tooth electrode strips 16. The main electrode strip 13 extends along a first direction, the first tooth electrode strip 15 and the second tooth electrode strip 16 are respectively located on two sides of the main electrode strip 13, the plurality of first tooth electrode strips 15 are arranged along the first direction, each first tooth electrode strip 15 extends along a second direction, the second tooth electrode strips 16 are arranged along the first direction, each second tooth electrode strip 16 extends along the second direction, and the first direction and the second direction intersect. In the direction perpendicular to the plane of the second substrate 2, at least one detection hollow part 6 overlaps at least one of a gap between two adjacent first tooth electrode strips 15 or a gap between two adjacent second tooth electrode strips 16.

When the main electrode 9 adopts the comb-like structure, based on its structure characteristic of the main electrode 9, the detection hollow part 6 can be disposed only at a position of the ground electrode 3 corresponding to at least one of the gap between the first tooth electrode strips 15 or the gap between the second tooth electrode strips 16, which implements the effective detection of a cell gap in an entire area in which the main electrode 9 is located and a status of liquid crystals 5. In this way, the cell gap test and the optical judgment are more accurately performed on a key area to determine whether phase shift can be accurately performed on a radio-frequency signal in the key area. In addition, there can be no need to provide an opening on the main electrode 9, thereby avoiding a loss, caused by the opening, of the radio-frequency signal transmitted on the main electrode strip 13. The main electrode 9 is of the comb-like structure, which can broaden a transmission path of the radio-frequency signal on the main electrode 9, thereby making the phase shift of the radio-frequency signal more sufficient.

Figure 11:
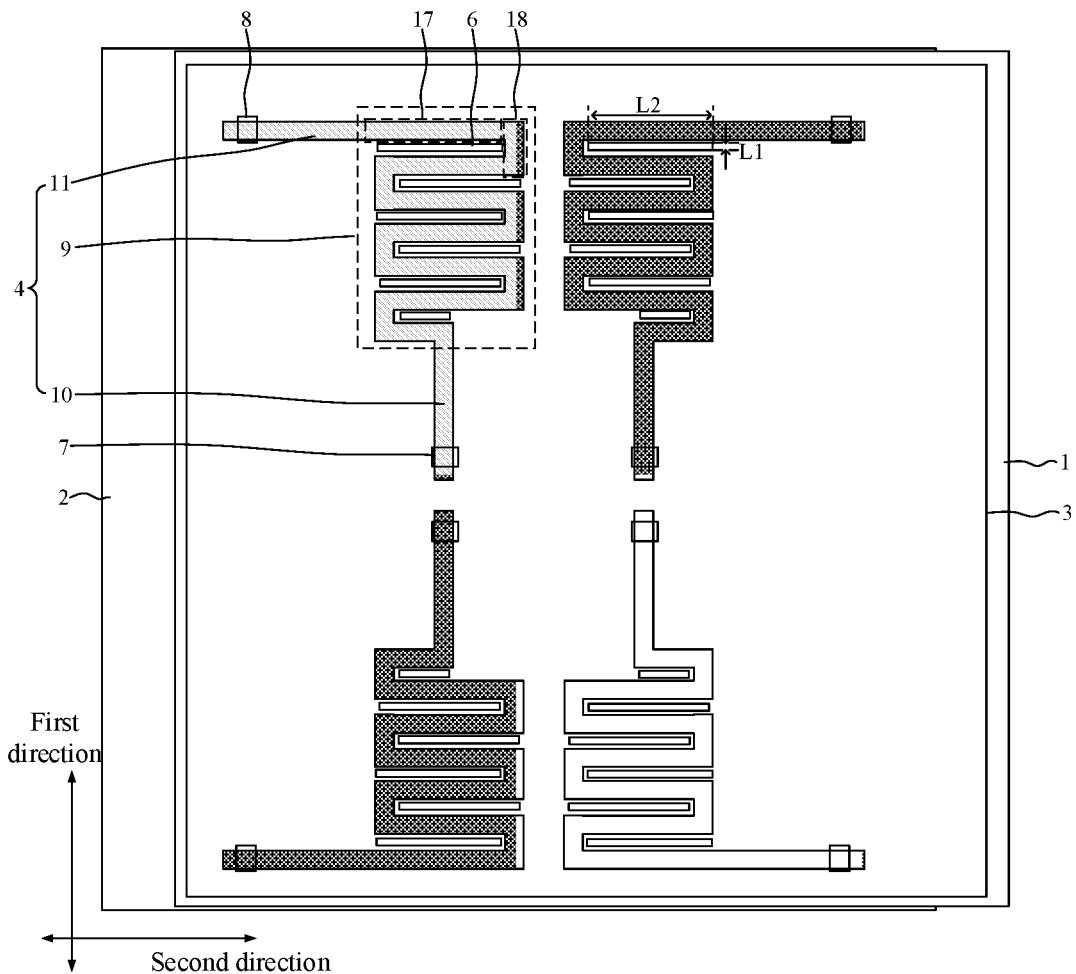
FIG. 11 is a further schematic diagram of a phase shifter according to an embodiment of the present disclosure.

In an embodiment, as shown in FIG. 11, FIG. 11 is a further schematic diagram of a phase shifter according to an embodiment of the present disclosure. A main electrode 9 is of a snake-shaped structure, the main electrode 9 includes a first electrode strip 17 extending along a second direction and a second electrode strip 18 extending along a first direction, two adjacent first electrode strips 17 are connected to each other through the second electrode strip 18, and the first direction and the second direction intersect. In the direction perpendicular to the plane of the second substrate 2, at least one detection hollow part 6 overlaps a gap between two adjacent first electrode strips 17.

When the main electrode 9 adopts the above snake-shaped structure, based on its structure characteristic of the main electrode 9, the detection hollow part 6 can be disposed only at a position of the ground electrode 3 corresponding to the gap between the first electrode strips 17, which implements the effective detection of a cell gap in an entire area in which the main electrode 9 is located and a status of liquid crystals 5. In this way, the cell gap test and the optical judgment are more accurately conducted on a key area to determine whether phase shift can be accurately conducted on the radio-frequency signal in the key area. There can be no need to provide an opening on the main electrode 9, thereby avoiding a loss, caused by the opening, of the radio-frequency signal transmitted on a main electrode strip 13. The main electrode 9 is of the snake-shaped structure, which can broaden a transmission path of the radio-frequency signal on the main electrode 9, thereby making the phase shift of the radio-frequency signal more sufficient.

In an embodiment, still referring to FIG. 8, FIG. 10, and FIG. 11, a width of the detection hollow part 6 in the first direction is less than a width, in the first direction, of the gap overlapping the detection hollow part 6, which can reduce the impact of the detection hollow part 6 on the shielding performance of the ground electrode 3.

In an embodiment, still referring to FIG. 8, FIG. 10, and FIG. 11, the detection hollow part 6 has the width L1 in the first direction and a width L2 in the second direction, where L1≥5 μm, and L2≥5 μm, which ensures that the widths of the detection hollow part 6 in the first direction and the second direction are not excessively small. In this way, a phenomenon of pinhole imaging is eliminated, so as to avoid impact on detection light emitted through the detection hollow part 6, and improve the detection accuracy.

Figure 12:
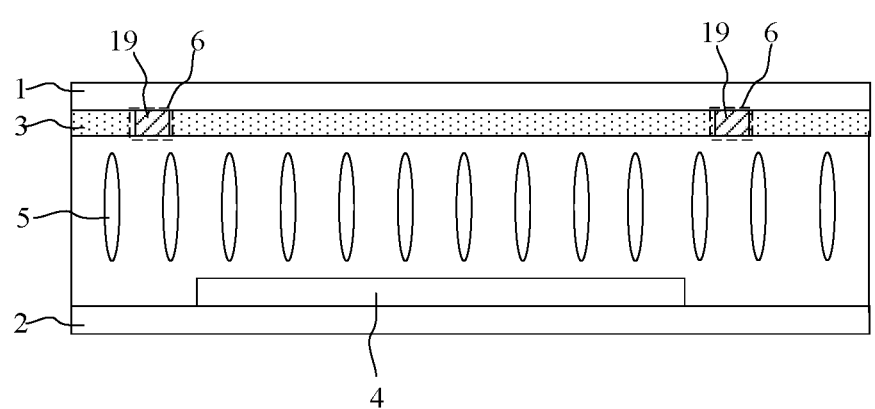
FIG. 12 is a schematic diagram of a transparent electrode according to an embodiment of the present disclosure.
Figure 13:
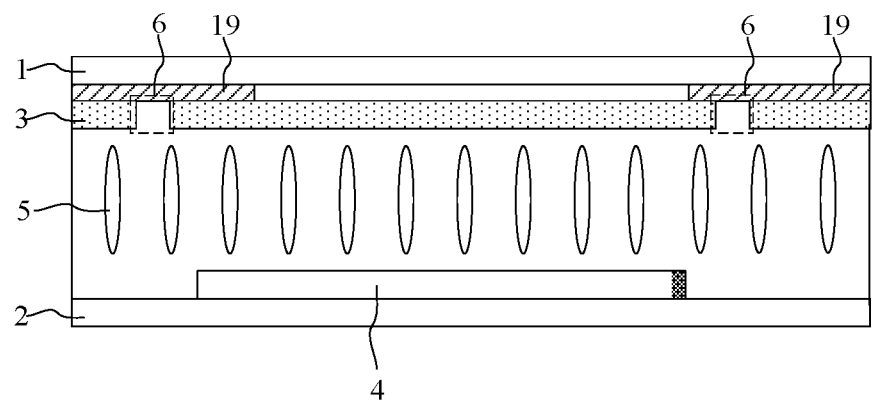
FIG. 13 is another schematic diagram of a transparent electrode according to an embodiment of the present disclosure.
Figure 14:
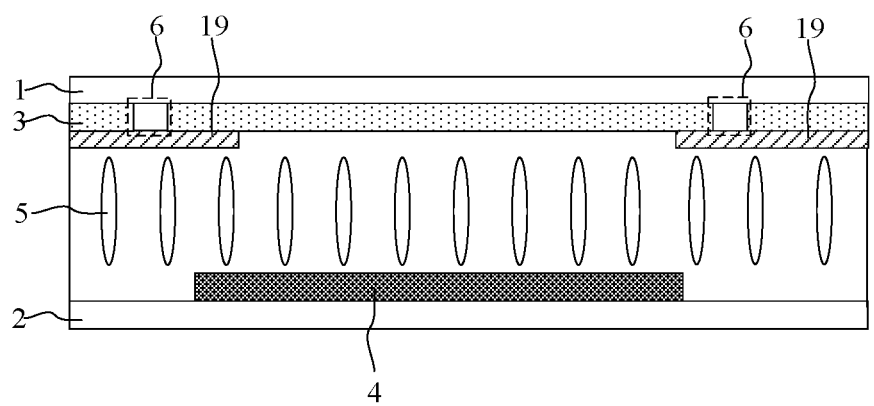
FIG. 14 is still another schematic diagram of a transparent electrode according to an embodiment of the present disclosure.

In an embodiment, as shown in FIG. 12 to FIG. 14, FIG. 12 is a schematic diagram of a transparent electrode according to an embodiment of the present disclosure, FIG. 13 is another schematic diagram of a transparent electrode according to an embodiment of the present disclosure, and FIG. 14 is still another schematic diagram of a transparent electrode according to an embodiment of the present disclosure. The phase shifter further includes a transparent electrode 19 electrically connected to a ground electrode 3. In the direction perpendicular to the plane of the first substrate 1, still referring to FIG. 12, the transparent electrode 19 covers the detection hollow part 6. In this case, the transparent electrode 19 and the ground electrode 3 are disposed in a same layer, the transparent electrode 19 does not overlap the ground electrode 3, and the transparent electrode 19 is only located inside the detection hollow part 6; and in the direction perpendicular to the plane of the first substrate 1, an orthographic projection of the transparent electrode 19 coincides with the detection hollow part 6; or, still referring to FIG. 13 and FIG. 14, the transparent electrode 19 overlaps the detection hollow part 6. In this case, the transparent electrode 19 and the ground electrode 3 are disposed in different layers.

With such configuration, based on a light transmittance characteristic of the transparent electrode 19, on the premise that the transparent electrode 19 does not block detection light and can still ensure normal detection, the transparent electrode 19 is electrically connected to the ground electrode 3, so that continuity of the signal transmission on the ground electrode 3 can be improved, and the shielding performance of the ground electrode 3 can be improved.

In an embodiment, still referring to FIG. 12, the transparent electrode 19 is located inside the detection hollow part 6. In this case, the transparent electrode 19 and the ground electrode 3 are disposed in a same layer, and the transparent electrode 19 does not additionally occupy space of a layer, which facilitates the thin and light design of the phase shifter. In an embodiment, still referring to FIG. 13, the transparent electrode 19 is located on a side of the ground electrode 3 face towards the first substrate 1; or still referring to FIG. 14, the transparent electrode 19 is located on a side of the ground electrode 3 facing away from the first substrate 1. In this case, the transparent electrode 19 and the ground electrode 3 are disposed in different layers, so as to increase a contact area between the transparent electrode 19 and the ground electrode 3, thereby improving the reliability of the electrical connection between the transparent electrode 19 and the ground electrode 3.

Figure 15:
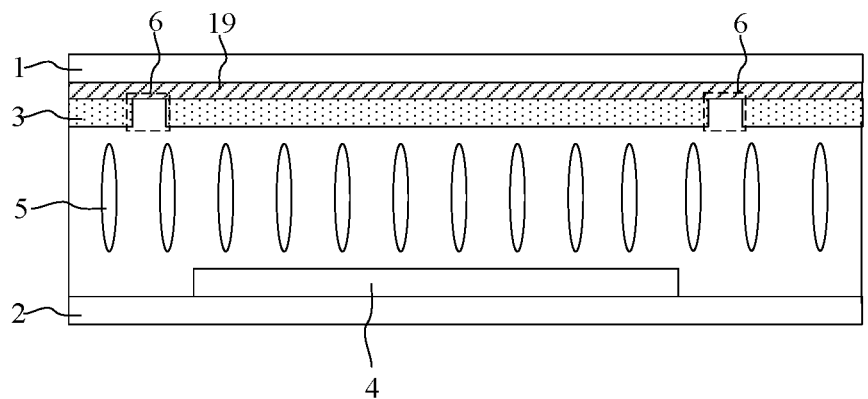
FIG. 15 is yet another schematic diagram of a transparent electrode according to an embodiment of the present disclosure.
Figure 16:
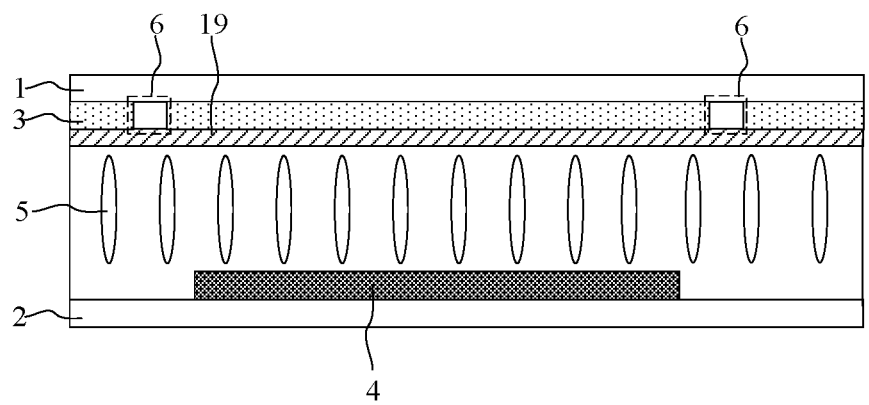
FIG. 16 is still yet another schematic diagram of a transparent electrode according to an embodiment of the present disclosure.

When the transparent electrode 19 overlaps the detection hollow part 6, as shown in FIG. 13 and FIG. 14, the transparent electrode 19 can be a plurality of electrode blocks arranged at intervals, or in other optional embodiments of the present disclosure, the transparent electrode 19 can be a whole-layer covering structure. For example, as shown in FIG. 15 and FIG. 16, FIG. 15 is yet another schematic diagram of a transparent electrode according to an embodiment of the present disclosure, and FIG. 16 is still yet another schematic diagram of a transparent electrode according to an embodiment of the present disclosure. In the direction perpendicular to the plane of the first substrate 1, an orthographic projection of the transparent electrode 19 covers an orthographic projection of the ground electrode 3.

Figure 17:
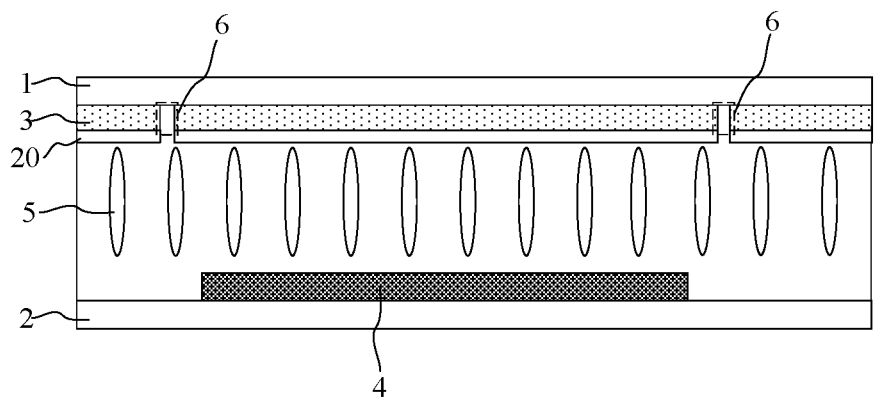
FIG. 17 is a schematic diagram of a protective layer according to an embodiment of the present disclosure.

In an embodiment, as shown in FIG. 17, FIG. 17 is a schematic diagram of a protective layer according to an embodiment of the present disclosure. A protective layer 20 is provided on a side of the ground electrode 3 facing away from the first substrate 1, to reduce a risk of oxidation and corrosion of the ground electrode 3 and improve the operating stability and reliability of the phase shifter during a fabrication process of the phase shifter. In an embodiment, a part of the protective layer 20 that overlaps the detection hollow part 6 is hollow. In this way, the detection light does not need to pass through the protective layer 20 when it is emitted through the detection hollow part 6, which reduces a loss of the detection light caused by the protective layer 20 and improves the detection accuracy.

It should be noted that the protective layer 20 can be made of an inorganic material, such as silicon nitride and silicon oxide, so as to reduce a loss of a radio-frequency signal caused by the protective layer 20 and improve the reliability of radio-frequency signal transmission.

Figure 18:
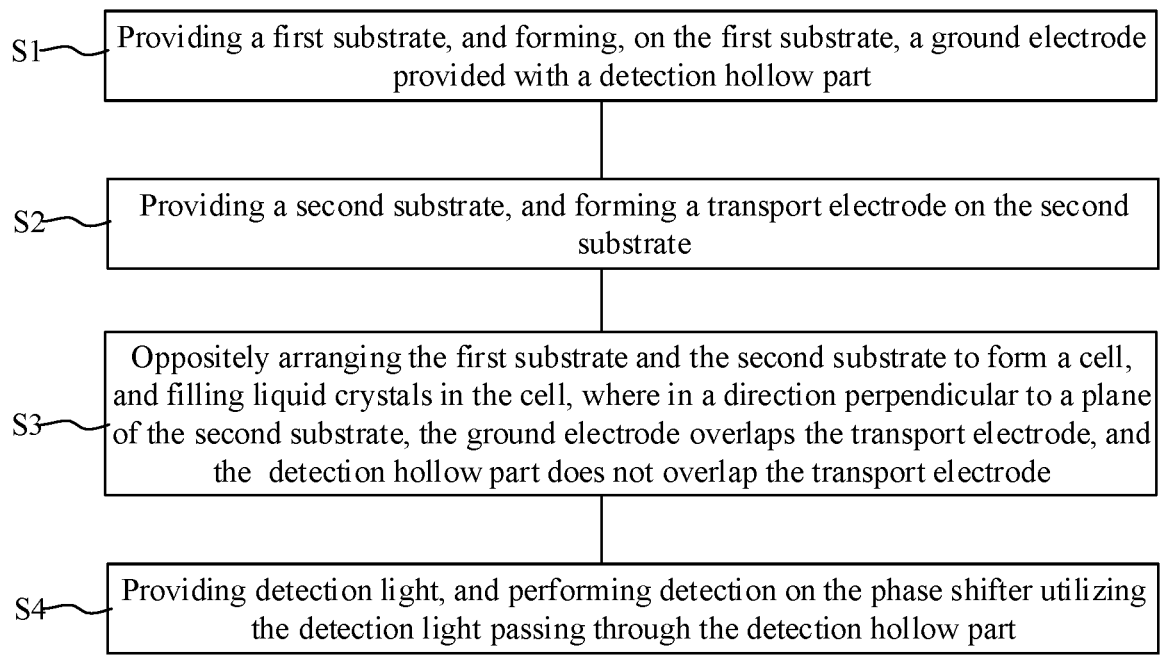
FIG. 18 is a flowchart of a fabrication method according to an embodiment of the present disclosure.

An embodiment of the present disclosure further provides a fabrication method of a phase shifter. The fabrication method is used for fabricating the foregoing phase shifter. With reference to FIG. 1 and FIG. 2, as shown in FIG. 18, FIG. 18 is a flowchart of a fabrication method according to an embodiment of the present disclosure. The fabrication method includes following steps.

At step S1, a first substrate 1 is provided, and a ground electrode 3 provided with a detection hollow part 6 is form on the first substrate 1.

At step S2, a second substrate 2 is provided, and a transmission electrode 4 is formed on the second substrate 2.

At step S3, the first substrate 1 and the second substrate 2 are oppositely arranged to form a cell, and liquid crystals 5 are formed in the cell, where in the direction perpendicular to the plane of the second substrate 2, the ground electrode 3 overlaps the transmission electrode 4, and the detection hollow part 6 does not overlap the transmission electrode 4.

With reference to the process of performing the cell gap test and the optical judgment on the phase shifter in the foregoing embodiments, according to the fabrication method provided in this embodiment of the present disclosure, the ground electrode 3 is provided with the detection hollow part 6, and after forming the cell, at least a part of the detection hollow part 6 does not overlap the transmission electrode 4. In this way, a light transmittance area can be formed in the liquid crystal cell of the phase shifter. Therefore, before the phase shifter is put into use, the cell gap test and the optical judgment can be performed on the phase shifter to detect whether the phase shifter is degraded or ineffective, thereby avoiding that a degraded phase shifter or an ineffective phase shifter is applied in the antenna. In this way, it is not only avoided that a subsequent antenna module fabrication process wastes cost, but also avoided that the radiation performance of the antenna is affected.

In an embodiment, to detect whether the phase shifter is degraded or ineffective, still refer to FIG. 18. After step S3 is conducted, the fabrication method further includes step S4.

At step S4, detection light is provided, and a detection is performed on the phase shifter utilizing the detection light that passes through the detection hollow part 6, for example, performing the cell gap test and the optical judgment. The processes of the cell gap test and the optical judgment have been described in the foregoing embodiments, which will not be repeated herein.

Figure 19:
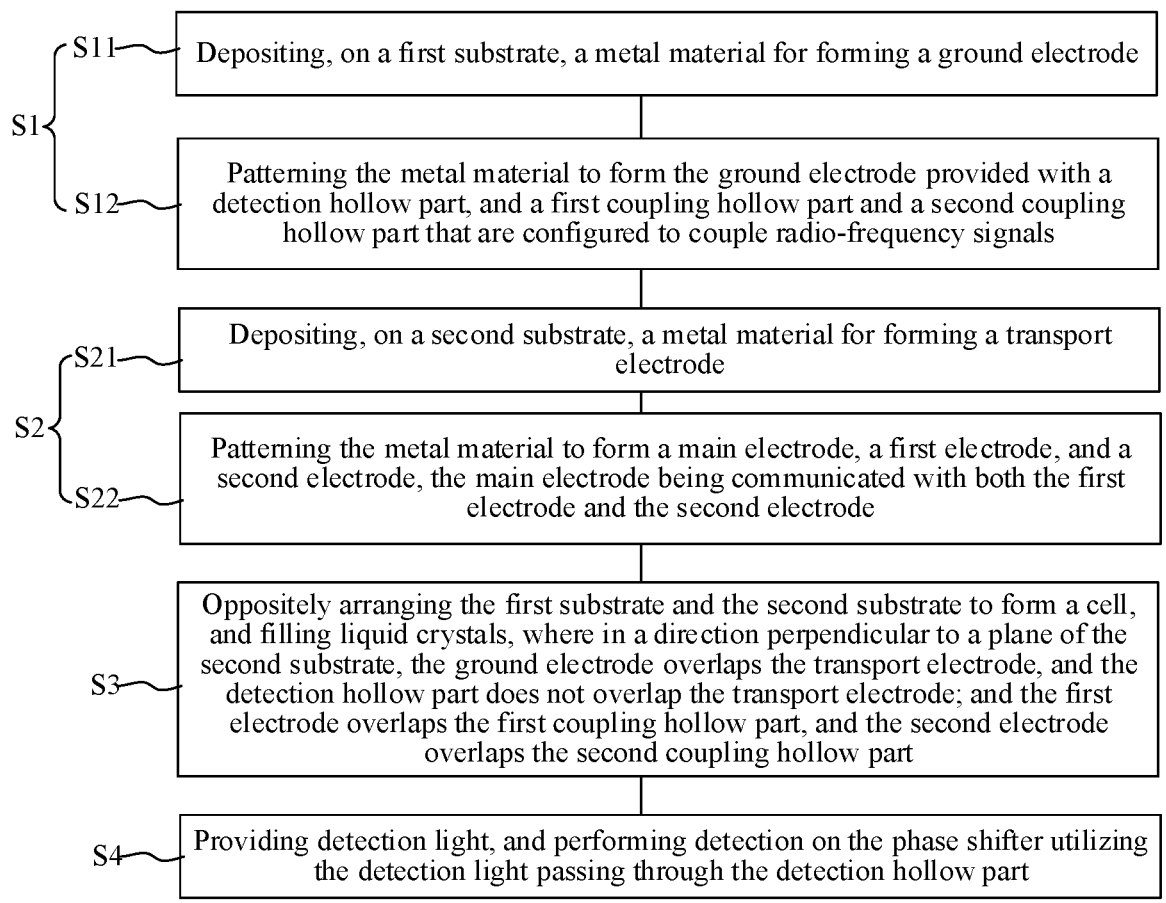
FIG. 19 is another flowchart of a fabrication method according to an embodiment of the present disclosure.

In an embodiment, with reference to FIG. 1 to FIG. 3, as shown in FIG. 19, FIG. 19 is another flowchart of a fabrication method according to an embodiment of the present disclosure. Step S1 can include step S11 and step S12.

At step S11, a metal material for forming the ground electrode 3 is deposited on the first substrate 1.

At step S12, the metal material is patterned to form the ground electrode 3 provided with the detection hollow part 6, and a first coupling hollow part 7 and a second coupling hollow part 8, and the first coupling hollow part 7 and the second coupling hollow part 8 are configured to couple radio-frequency signals.

Step S2 can include step S21 and step S21.

At step S21, a metal material for forming the transmission electrode 4 is deposited on the second substrate 2.

At step S22, the metal material are patterned to form a main electrode 9, a first electrode 10, and a second electrode 11, and the main electrode 9 is connected to both the first electrode 10 and the second electrode 11.

In addition, in step S3, after the first substrate 1 and the second substrate 2 are oppositely arranged to form the cell, in the direction perpendicular to the plane of the first substrate 1, the first electrode 10 overlaps the first coupling hollow part 7, and the second electrode 11 overlaps the second coupling hollow part 8.

With reference to FIG. 20 and FIG. 21, when the phase shifter performs phase shift on the radio-frequency signal, the radio-frequency signal transmitted on the feeder 200 is coupled to the first electrode 10 of the transmission electrode 4 through the first coupling hollow part 7 of the ground electrode 3 and is transmitted to the main electrode 9; the liquid crystals 5 rotate under the an electric field formed by the ground electrode 3 and the transmission electrode 4, and thus a dielectric constant of the liquid crystals 5 changes; the radio-frequency signal transmitted on the main electrode 9 is phase-shifted, and a phase-shifted radio-frequency signal is transmitted to the second electrode 11, is coupled to a radiator 300 through the second coupling hollow part 8 of the ground electrode 3, and then is radiated through the radiator 300. In this way, normal signal radiation of the antenna is ensured.

In an embodiment, with reference to FIG. 1, FIG. 4, and FIG. 6, a process of forming the main electrode 9 in step S22 includes forming the main electrode 9 of a planar structure. Still referring to FIG. 1, after the first substrate 1 and the second substrate 2 are oppositely arranged to form the cell, in the direction perpendicular to the plane of the second substrate 2, the detection hollow part 6 does not overlap the main electrode 9, and a spacing between the detection hollow part 6 and an edge of the transmission electrode 4 is L, where 0≤L≤2 mm. In this case, the detection hollow part 6 is disposed in an area within 2 mm around the main electrode 9, so that the detection light emitted through the detection hollow part 6 can better reflect a cell gap in the area in which the main electrode 9 is located, the alignment status of the liquid crystals 5, and the filling status of the liquid crystals 5. In this way, the cell gap test and the optical judgment can be performed on the key area in the phase shifter more accurately.

In an embodiment, still referring to FIG. 4, after the first substrate 1 and the second substrate 2 are oppositely arranged to form the cell, in the direction perpendicular to the plane of the second substrate 2, a part of the detection hollow part 6 overlaps the main electrode 9, and the other part of the detection hollow part 6 does not overlap the main electrode 9. In this way, the emitted detection light can accurately reflect a cell gap at an edge of the main electrode 9 and a status of the liquid crystals 5, which can better reflect a cell gap in an area in which the main electrode 9 is located, the alignment of the liquid crystals 5, and a filling status of the liquid crystals 5.

In an embodiment, still referring to FIG. 6, an opening 12 is provided on the main electrode 9, and after the first substrate 1 and the second substrate 2 are oppositely arranged to form the cell, in the direction perpendicular to the plane of the second substrate 2, the detection hollow part 6 overlaps the opening 12. In this case, the detection light that passes through the opening 12 and that is emitted through the detection hollow part 6 can directly and accurately reflect the cell gap in an area in which the main electrode 9 is located and a status of the liquid crystals 5, thereby achieving more accurate cell gap test and the optical judgment on a key area.

In an embodiment, with reference to FIG. 8, a process of forming the main electrode 9 in step S22 includes forming the main electrode 9 of a comb tooth-shaped structure, the main electrode 9 includes a main electrode strip 13 and tooth electrode strips 14, the main electrode strip 13 extends along the first direction, the tooth electrode strips 14 are arranged along the first direction, each tooth electrode strip 14 extends along the second direction, and the first direction and the second direction intersect. In addition, after the first substrate 1 and the second substrate 2 are oppositely arranged to form the cell, in the direction perpendicular to the plane of the second substrate 2, at least a part of the detection hollow part 6 overlaps a gap between two adjacent tooth electrode strips 14.

According to the foregoing fabrication method, the main electrode 9 is of the comb-like structure, based on its structure characteristic of the main electrode 9, the detection hollow part 6 can be disposed only at a position of the ground electrode 3 corresponding to the gap between the tooth electrode strips 14, which implements the effective detection of a cell gap in an entire area in which the main electrode 9 is located and a status of the liquid crystals 5. In this way, the cell gap test and the optical judgment are more accurately performed on a key area to determine whether phase shift can be accurately conducted on a radio-frequency signal in the key area. In addition, there can be no need to provide an opening on the main electrode 9, thereby avoiding a loss, caused by the opening, of the radio-frequency signal transmitted on the main electrode strip 13.

In an embodiment, with reference to FIG. 10, a process of forming the main electrode 9 in step S22 includes forming the main electrode 9 of a comb tooth-shaped structure, the main electrode 9 includes a main electrode strip 13, first tooth electrode strips 15, and second tooth electrode strips 16, the main electrode strip 13 extends along a first direction, the first tooth electrode strip 15 and the second tooth electrode strip 16 are respectively located on two sides of the main electrode strip 13, the first tooth electrode strips 15 are arranged along the first direction, each first tooth electrode strip 15 extends along a second direction, the second tooth electrode strips 16 are arranged along the first direction, each second tooth electrode strip 16 extends along the second direction, and the first direction and the second direction intersect. In addition, after the first substrate 1 and the second substrate 2 are oppositely arranged to form the cell, in the direction perpendicular to the plane of the second substrate 2, at least a part of the detection hollow part 6 overlaps a gap between two adjacent first tooth electrode strips 15 and a gap between two adjacent second tooth electrode strips 16.

According to the foregoing fabrication method, the main electrode 9 is of the comb-like structure, based on a its structure characteristic of the main electrode 9, the detection hollow part 6 can be disposed only at a position that is in the ground electrode 3 and that is corresponding to at least one of the gap between the first tooth electrode strips 15 or the gap between the second tooth electrode strips 16, to implement the effective detection of a cell gap in an entire area in which the main electrode 9 is located and a status of the liquid crystals 5. In this way, the cell gap test and the optical judgment are more accurately performed on a key area to determine whether phase shift can be accurately performed on a radio-frequency signal in the key area. In addition, there can be no need to provide an opening on the main electrode 9, thereby avoiding a loss, caused by the opening, of the radio-frequency signal transmitted on the main electrode strip 13.

In an embodiment, with reference to FIG. 11, a process of forming the main electrode 9 in step S22 includes forming the main electrode 9 of a snake-shaped structure, the main electrode 9 includes a first electrode strip 17 extending along the second direction and a second electrode strip 18 extending along a first direction, two adjacent first electrode strips 17 are connected to each other through the second electrode strip 18, and the first direction and the second direction intersect. In addition, after the first substrate 1 and the second substrate 2 are oppositely arranged to form the cell, in the direction perpendicular to the plane of the second substrate 2, at least a part of the detection hollow part 6 overlaps a gap between two adjacent first electrode strips 17.

According to the foregoing fabrication method, the main electrode 9 is of the snake-shaped structure, based on its structure characteristic of the main electrode 9, the detection hollow part 6 can be disposed only at a position of the ground electrode 3 corresponding to the gap between the first electrode strips 17, to implement the effective detection of a cell gap in an entire area in which the main electrode 9 is located and a status of the liquid crystals 5. In this way, the cell gap test and the optical judgment are more accurately performed on the key area to determine whether phase shift can be accurately performed on a radio-frequency signal in the key area. In addition, there can be no need to provide an opening on the main electrode 9, thereby avoiding a loss, caused by the opening, of the radio-frequency signal transmitted on a main electrode strip 13.

In an embodiment, with reference to FIG. 12 to FIG. 14, the fabrication method provided in this embodiment of the present disclosure further includes forming a transparent electrode 19, the transparent electrode 19 is electrically connected to the ground electrode 3; and in the direction perpendicular to the plane of the first substrate 1, the transparent electrode 19 covers or overlaps the detection hollow part 6.

Specifically, when the transparent electrode 19 covers the detection hollow part 6, with reference to FIG. 12, the transparent electrode 19 and the ground electrode 3 are disposed in a same layer, and the transparent electrode 19 does not overlap the ground electrode 3; and in this case, the transparent electrode 19 can be formed on the first substrate 1 first and then the ground electrode 3 can be formed, or the ground electrode 3 can be formed on the first substrate 1 first and then the transparent electrode 19 can be formed. Alternatively, when the transparent electrode 19 overlaps the detection hollow part 6, the transparent electrode 19 and the ground electrode 3 are disposed in different layers. With reference to FIG. 13, the transparent electrode 19 is located on a side of the ground electrode 3 facing towards the first substrate 1; and in this case, the transparent electrode 19 is formed on the first substrate 1 first and then the ground electrode 3 is formed. In an embodiment, with reference to FIG. 14, the transparent electrode 19 is located on a side of the ground electrode 3 facing away from the first substrate 1; and in this case, the ground electrode 3 is formed on the first substrate 1 first and then the transparent electrode 19 is formed.

With such configuration, based on a light transmittance characteristic of the transparent electrode 19, on the premise that the transparent electrode 19 does not block detection light and can still ensure normal detection, the transparent electrode 19 is electrically connected to the ground electrode 3, so that continuity of signal transmission on the ground electrode 3 can be improved, and the shielding performance of the ground electrode 3 can be improved.

In an embodiment, with reference to FIG. 17, after step S1 is performed, the fabrication method further includes: depositing a layer of inorganic material such as silicon nitride or silicon oxide on the side of the ground electrode 3 facing away from the first substrate 1, to form the protective layer 20 to protect the ground electrode 3 from being oxidized or corroded and make a part of the protective layer 20 overlapping the detection hollow part 6 become hollow. In this way, the detection light does not need to pass through the protective layer 20 when it is emitted through the detection hollow part 6, which reduces a loss of the detection light caused by the protective layer 20 and improves the detection accuracy.

An embodiment of the present disclosure further provides an antenna, as shown in FIG. 20 and FIG. 21. FIG. 20 is a schematic diagram of the antenna according to this embodiment of the present disclosure. FIG. 21 is a cross-sectional view of FIG. 20 along F1-F2. The antenna includes the foregoing phase shifter 100; a feeder 200 disposed on a side of the first substrate 1 facing away from the second substrate 2, electrically connected to a radio-frequency signal source 400, and configured to receive a radio-frequency signal provided by the radio-frequency signal source 400; and a radiator 300 disposed on the side of the first substrate 1 facing away from the second substrate 2, and configured to radiate a phase-shifted radio-frequency signal.

The antenna provided in this embodiment of the present disclosure includes the phase shifter 100. Therefore, by using this antenna, a yield of phase shifters applied to the antenna can be improved, the accuracy of a radiation angle of a beam radiated by the antenna can be improved, and the radiation performance of the antenna can be optimized.

In an embodiment, still referring to FIG. 20 and FIG. 21, the ground electrode is further provided with a first coupling hollow part 7 and a second coupling hollow part 8 that are configured to couple radio-frequency signals; and in the direction perpendicular to the plane of the first substrate 1, the feeder 200 overlaps the first coupling hollow part 7, the radiator 300 overlaps the second coupling hollow part 8, and neither the feeder 200 nor the radiator 300 overlaps the detection hollow part 6.

Specifically, the radio-frequency signal transmitted on the feeder 200 is coupled to the transmission electrode 4 through the first coupling hollow part 7 of the ground electrode 3; the liquid crystals 5 rotate under the electric field formed by the ground electrode 3 and the transmission electrode 4, and thus a dielectric constant of the liquid crystals 5 changes; the radio-frequency signal transmitted on the transmission electrode 4 is phase-shifted, and a phase-shifted radio-frequency signal is coupled to the radiator 300 through the second coupling hollow part 8 of the ground electrode 3, and is radiated through the radiator 300. The feeder 200 and the radiator 300 does not overlap the detection hollow part 6, which can also prevent the feeder 200 and the radiator 300 from blocking the detection hollow part 6 and improve the detection reliability.

The above descriptions are merely some embodiments of the present disclosure, and are not intended to limit the present disclosure. Any modifications, equivalent replacements, improvements, and the like made within the principle of the present disclosure shall be all included in the protection scope of the present disclosure.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that they can still make modifications to the technical solutions described in the above embodiments or make equivalent replacements to some or all technical features thereof, without departing from the essence of the technical solutions in the embodiments of the present disclosure.

What is claimed is:

1. A phase shifter, comprising:
a first substrate and a second substrate that are disposed opposite to each other;
a ground electrode disposed on a side of the first substrate facing towards the second substrate;
a transmission electrode disposed on a side of the second substrate facing towards the first substrate, wherein the transmission electrode overlaps the ground electrode in a direction perpendicular to a plane of the second substrate; and
liquid crystals filled between the first substrate and the second substrate,
wherein the ground electrode is provided with at least one detection hollow part, and at least a part of the at least one detection hollow part does not overlap the transmission electrode in the direction perpendicular to the plane of the second substrate in such a manner that a light transmittance area through which detection light provided to the phase shifter is transmitted is formed in a liquid crystal cell of the phase shifter to allow the detection light to pass through the second substrate, the liquid crystals, and the at least one detection hollow part.

2. The phase shifter according to claim 1, wherein the ground electrode and the transmission electrode are made of an opaque metal material.

3. The phase shifter according to claim 1, wherein the ground electrode is further provided with a first coupling hollow part and a second coupling hollow part that are configured to couple radio-frequency signals; and
the transmission electrode comprises a main electrode, a first electrode, and a second electrode, and the main electrode is connected to both the first electrode and the second electrode, wherein in a direction perpendicular to a plane of the first substrate, the first electrode overlaps the first coupling hollow part, and the second electrode overlaps the second coupling hollow part.

4. The phase shifter according to claim 3, wherein the main electrode is a planar structure; and in the direction perpendicular to the plane of the second substrate, the at least one detection hollow part does not overlap the main electrode, and a spacing between one of the at least one detection hollow part and an edge of the transmission electrode is L, where 0≤L≤2 mm.

5. The phase shifter according to claim 3, wherein the main electrode is a planar structure; and in the direction perpendicular to the plane of the second substrate, a part of one of the at least one detection hollow part overlaps the main electrode, and the other part of the one of the at least one detection hollow part does not overlap the main electrode.

6. The phase shifter according to claim 3, wherein the main electrode is a planar structure; at least one opening is provided on the main electrode; and in the direction perpendicular to the plane of the second substrate, one of the at least one detection hollow part overlaps one of the at least one opening.

7. The phase shifter according to claim 6, wherein the opening covers a part of an edge of the main electrode.

8. The phase shifter according to claim 3, wherein the main electrode is a comb tooth-shaped structure and comprises a main electrode strip and tooth electrode strips, wherein the main electrode strip extends along a first direction, the tooth electrode strips are arranged along the first direction, and each of the tooth electrode strips extends along a second direction intersecting the first direction; and
in the direction perpendicular to the plane of the second substrate, one of the at least one detection hollow part overlaps a gap between two adjacent tooth electrode strips of the tooth electrode strips.

9. The phase shifter according to claim 3, wherein the main electrode is a comb tooth-shaped structure, and the main electrode comprises a main electrode strip, first tooth electrode strips, and second tooth electrode strips, wherein the main electrode strip extends along a first direction, each of the first tooth electrode strips and each of the second tooth electrode strips are located at two sides of the main electrode strip, respectively, the first tooth electrode strips are arranged along the first direction, each of the first tooth electrode strips extends along a second direction, the second tooth electrode strips are arranged along the first direction, and each of the second tooth electrode strips extends along the second direction intersecting the first direction; and
in the direction perpendicular to the plane of the second substrate, one of the at least one detection hollow part overlaps at least one of a gap between two adjacent first tooth electrode strips of the first tooth electrode strips or a gap between two adjacent second tooth electrode strips of the second tooth electrode strips.

10. The phase shifter according to claim 3, wherein the main electrode is a snake-shaped structure, the main electrode comprises first electrode strips and second electrode strips, each of the first electrode strips extends along a second direction, and each of the second electrode strips extends along a first direction, two adjacent first electrode strips of the first electrode strips are connected to each other through one of the second electrode strips, and the first direction and the second direction intersect; and
in the direction perpendicular to the plane of the second substrate, one of the at least one detection hollow part overlaps a gap between two adjacent first electrode strips of the first electrode strips.

11. The phase shifter according to claim 3,
wherein the main electrode is a comb tooth-shaped structure and comprises a main electrode strip and tooth electrode strips, wherein the main electrode strip extends along a first direction, the tooth electrode strips are arranged along the first direction, each of the tooth electrode strips extends along a second direction intersecting the first direction; and wherein in the direction perpendicular to the plane of the second substrate, one of the at least one detection hollow part overlaps a gap between two adjacent tooth electrode strips of the tooth electrode strips; or,
wherein the main electrode is a comb tooth-shaped structure, and the main electrode comprises a main electrode strip, first tooth electrode strips, and second tooth electrode strips, wherein the main electrode strip extends along a first direction, each of the first tooth electrode strips and each of the second tooth electrode strips are located at two sides of the main electrode strip, respectively, the first tooth electrode strips are arranged along the first direction, each of the first tooth electrode strips extends along a second direction, the second tooth electrode strips are arranged along the first direction, and each of the second tooth electrode strips extends along the second direction intersecting the first direction; and wherein in the direction perpendicular to the plane of the second substrate, one of the at least one detection hollow part overlaps at least one of a gap between two adjacent first tooth electrode strips of the first tooth electrode strips or a gap between two adjacent second tooth electrode strips of the second tooth electrode strips; or
wherein the main electrode is a snake-shaped structure, the main electrode comprises first electrode strips and second electrode strips, each of the first electrode strips extends along a second direction, and each of the second electrode strips extends along a first direction, two adjacent first electrode strips of the first electrode strips are connected to each other through one of the second electrode strips, and the first direction and the second direction intersect; and wherein in the direction perpendicular to the plane of the second substrate, one of the at least one detection hollow part overlaps a gap between two adjacent first electrode strips of the first electrode strips; and wherein a width of the one of the at least one detection hollow part in the first direction is smaller than a width of the gap overlapping the detection hollow part in the first direction.

12. The phase shifter according to claim 1, wherein one of the at least one detection hollow part has a width L1 in a first direction and a width L2 in a second direction, where L1≥5 μm, and L2≥5 μm.

13. The phase shifter according to claim 1, further comprising:
a transparent electrode electrically connected to the ground electrode, wherein in a direction perpendicular to a plane of the first substrate, the transparent electrode covers or overlaps the at least one detection hollow part.

14. The phase shifter according to claim 13, wherein the transparent electrode is located in the at least one detection hollow part, or located on a side of the ground electrode facing towards the first substrate, or located on a side of the ground electrode facing away from the first substrate.

15. The phase shifter according to claim 1, wherein a protective layer is provided on a side of the ground electrode facing away from the first substrate, and at least one part of the protective layer that overlaps the at least one detection hollow part is hollow.

16. A fabrication method of a phase shifter, comprising:
providing a first substrate, and forming, on the first substrate, a ground electrode provided with at least one detection hollow part;
providing a second substrate, and forming a transmission electrode on the second substrate; and
oppositely arranging the first substrate and the second substrate to form a cell, and filling liquid crystals in the cell, wherein in a direction perpendicular to a plane of the second substrate, the ground electrode overlaps the transmission electrode, and the at least one detection hollow part does not overlap the transmission electrode in such a manner that a light transmittance area through which detection light provided to the phase shifter is transmitted is formed in a liquid crystal cell of the phase shifter to allow the detection light to pass through the second substrate, the liquid crystals, and the at least one detection hollow part;
wherein the fabrication method further comprises, after oppositely arranging the first substrate and the second substrate to form the cell:
providing detection light, and detecting the phase shifter utilizing the detection light that passes through the at least one detection hollow part.

17. The fabrication method according to claim 16, wherein said forming, on the first substrate, the ground electrode provided with the at least one detection hollow part comprises:
depositing, on the first substrate, a metal material for forming the ground electrode, and
patterning the metal material to form the ground electrode provided with the at least detection hollow part, a first coupling hollow part, and a second coupling hollow part, wherein the first coupling hollow part and the second coupling hollow part are configured to couple radio-frequency signals;
wherein said forming the transmission electrode on the second substrate comprises:
depositing, on the second substrate, a metal material for forming the transmission electrode, and
patterning the metal material to form a main electrode, a first electrode, and a second electrode, wherein the main electrode is connected to both the first electrode and the second electrode;
wherein after the first substrate and the second substrate are oppositely arranged to form the cell, in a direction perpendicular to a plane of the first substrate, the first electrode overlaps the first coupling hollow part, and the second electrode overlaps the second coupling hollow part;
wherein said forming the main electrode comprises forming the main electrode of a planar structure; and after the first substrate and the second substrate are oppositely arranged to form the cell, in the direction perpendicular to the plane of the second substrate, the at least one detection hollow part does not overlap the main electrode, and a spacing between one of the at least one detection hollow part and an edge of the transmission electrode is L, where 0≤L≤2 mm; or after the first substrate and the second substrate are oppositely arranged to form the cell, in the direction perpendicular to the plane of the second substrate, a part of one of the at least one detection hollow part overlaps the main electrode, and the other part of the at least one detection hollow part does not overlap the main electrode; or at least one opening is provided on the main electrode, and after the first substrate and the second substrate are oppositely arranged to form the cell, in the direction perpendicular to the plane of the second substrate, one of the at least one detection hollow part overlaps one of the at least one opening; or
wherein said forming the main electrode comprises forming the main electrode of a comb tooth-shaped structure, wherein the main electrode comprises a main electrode strip and tooth electrode strips, the main electrode strip extends along a first direction, the tooth electrode strips are arranged along the first direction, each of the tooth electrode strips extends along a second direction intersecting the first direction; and after the first substrate and the second substrate are oppositely arranged to form the cell, in the direction perpendicular to the plane of the second substrate, one of the at least one detection hollow part overlaps a gap between two adjacent tooth electrode strips of the tooth electrode strips; or
wherein said forming the main electrode comprises forming the main electrode of a comb tooth-shaped structure, wherein the main electrode comprises a main electrode strip, first tooth electrode strips, and second tooth electrode strips, the main electrode strip extends along a first direction, each of the first tooth electrode strips and each of the second tooth electrode strips are located at two sides of the main electrode strip, respectively, the first tooth electrode strips are arranged along the first direction, each of the first tooth electrode strips extends along a second direction, the second tooth electrode strips are arranged along the first direction, each of the second tooth electrode strips extends along the second direction intersecting the first direction; and after the first substrate and the second substrate are oppositely arranged to form the cell, in the direction perpendicular to the plane of the second substrate, one of the at least one detection hollow part overlaps a gap between two adjacent first tooth electrode strips of the first tooth electrode strips and a gap between two adjacent second tooth electrode strips of the second tooth electrode strips; or wherein said forming the main electrode comprises: forming the main electrode of a snake-shaped structure, wherein the main electrode comprises first electrode strips and second electrode strips, each of the first electrode strip extends along a second direction, each of the second electrode strips extends along a first direction, two adjacent first electrode strips of the first electrode strips are connected to each other through one of the second electrode strips, and the first direction and the second direction intersect; and after the first substrate and the second substrate are oppositely arranged to form the cell, in the direction perpendicular to the plane of the second substrate, one of the at least one detection hollow part overlaps a gap between two adjacent first electrode strips of the first electrode strips.

18. The fabrication method according to claim 16, further comprising:
forming a transparent electrode, wherein the transparent electrode is electrically connected to the ground electrode, and in a direction perpendicular to a plane of the first substrate, the transparent electrode covers or overlaps the at least one detection hollow part.

19. The fabrication method according to claim 16, further comprising, after said forming, on the first substrate, the ground electrode provided with the at least one detection hollow part:
forming a protective layer on a side of the ground electrode facing away from the first substrate, wherein at least one part of the protective layer that overlaps the at least one detection hollow part is hollow.

20. An antenna, comprising:
a phase shifter, wherein the phase shifter comprises:
a first substrate and a second substrate that are disposed opposite to each other;
a ground electrode disposed on a side of the first substrate facing towards the second substrate;
a transmission electrode disposed on a side of the second substrate facing towards the first substrate, wherein the transmission electrode overlaps the ground electrode in a direction perpendicular to a plane of the second substrate; and
liquid crystals filled between the first substrate and the second substrate,
wherein the ground electrode is provided with at least one detection hollow part, and at least a part of the at least one detection hollow part does not overlap the transmission electrode in the direction perpendicular to the plane of the second substrate in such a manner that a light transmittance area through which detection light provided to the phase shifter is transmitted is formed in a liquid crystal cell of the phase shifter to allow the detection light to pass through the second substrate, the liquid crystals, and the at least one detection hollow part;
a feeder disposed on a side of the first substrate facing away from the second substrate, and configured to receive a radio-frequency signal; and
a radiator disposed on the side of the first substrate facing away from the second substrate, and configured to radiate a phase-shifted radio-frequency signal.

* * * * *